United States Patent
Nose et al.

(10) Patent No.: US 7,130,081 B2
(45) Date of Patent: Oct. 31, 2006

(54) IMAGE PROCESSING METHOD, IMAGE PROCESSING APPARATUS AND RECORDING MEDIUM

(75) Inventors: Masaki Nose, Kawasaki (JP); Kazuhiko Sato, Minato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/456,578

(22) Filed: Jun. 9, 2003

(65) Prior Publication Data
US 2003/0210430 A1 Nov. 13, 2003

Related U.S. Application Data

(63) Continuation of application No. PCT/JP00/08745, filed on Dec. 11, 2000.

(51) Int. Cl.
*H04N 1/405* (2006.01)
*H04N 1/52* (2006.01)

(52) U.S. Cl. ............ 358/2.1; 358/3.03; 358/3.16; 358/3.21; 358/3.23; 358/534; 358/535

(58) Field of Classification Search ........ 358/1.9, 358/3.03, 3.05, 3.06, 3.13, 3.14, 3.19, 3.21, 358/534, 535, 536, 3.26, 533, 2.1, 3.16, 3.23
See application file for complete search history.

(56) References Cited

U.S. PATENT DOCUMENTS

| | | | | |
|---|---|---|---|---|
| 5,949,965 | A * | 9/1999 | Gondek | 358/1.9 |
| 6,363,172 | B1 * | 3/2002 | Cheung et al. | 358/534 |
| 2005/0237575 | A1 * | 10/2005 | Yamazaki | 358/3.03 |

FOREIGN PATENT DOCUMENTS

| | | |
|---|---|---|
| EP | 0 917 352 A2 | 5/1999 |
| JP | 4-3658 | 1/1992 |
| JP | 6-113125 | 4/1994 |
| JP | 6-253133 | 9/1994 |
| JP | 8-307720 | 11/1996 |
| JP | 10-150563 | 6/1998 |
| JP | 11-58837 | 3/1999 |
| JP | 11-150652 | 6/1999 |
| JP | 11-254711 | 9/1999 |

OTHER PUBLICATIONS

JPO Abstract & Machine English Translation of JP 08-307720.*
JPO Abstract & Machine English Translation of JP 10-150563.*
Haruo Sakata, et al; "Chromatic Spatial Frequency Characteristics of Human Visual System (color Difference Discrimiation)"; Television; vol. 31, No. 1; 1977; pp. 29-35; and English Translation.

* cited by examiner

*Primary Examiner*—Scott A. Rogers
(74) *Attorney, Agent, or Firm*—Armstrong, Kratz, Quintos, Hanson & Brooks, LLP.

(57) ABSTRACT

The present invention relates to an image processing method, an image processing apparatus and a recording medium that convert a grey scale image into an area gradation image. The present invention intends to provide an image processing method, an image processing apparatus and a recording medium capable of increasing processing speed in a state where high image quality is maintained. In the image processing method and the image processing apparatus according to the present invention, image data of a C component and image data of an M component in grey scale image data are converted into halftone image data in accordance with an error diffusion method, and image data of a Y component are converted into halftone image data in accordance with a blue noise mask method.

11 Claims, 13 Drawing Sheets

PROCESSING TIME

DA

AM

DB

FM

IMAGE PROCESSING METHOD, IMAGE PROCESSING APPARATUS AND RECORDING MEDIUM

This application is a continuation of international application PCT/JP00/08745, filed Dec. 11, 2000.

TECHNICAL FIELD

The present invention relates to an image processing method, an image processing apparatus and a recording medium and, more particularly, to an image processing method, an image processing apparatus and a recording medium that can convert a grey scale image into an area gradation image.

Since some devices such as a display and a printer have limits on gradation reducibility, a grey scale image 101 is converted into an area gradation image (halftone image) 102 as shown in FIG. 1, that is, the grey scale image 101 is converted into a dot pattern. As such a conversion method, there are various techniques such as an error diffusion method and a blue noise mask method. The error diffusion method and the blue noise mask method have some advantages in that the error diffusion method makes it possible to enhance image quality and the blue noise mask method makes it possible to increase processing speed.

BACKGROUND ART

First, the error diffusion method is described.

FIG. 2 is a block diagram illustrating functions for implementing the error diffusion method.

Input image data are sequentially supplied to an adding part 111 by unit of one pixel. Based on a computed operation result, the adding part 111 receives an error diffused to the pixel from a line buffer 112. The adding part 111 adds the error from the line buffer 112 to the input image data so as to generate correction data. The correction data are supplied to a comparison part 113 and an error data generating part 114. The comparison part 113 compares the correction data with a predetermined threshold. If the correction data are larger than the threshold, the dot in question is determined as black. In contrast, if the correction data are smaller than the threshold, the dot is determined as white.

The comparison part 113 supplies an output value to the error data generating part 114. The error data generating part 114 generates error data from the output value and the correction data.

The error data are determined according to the formula; (correction data)−{(output value)×255}. The computed error data are supplied to an error filtering part 115.

The error filtering part 115 computes an error diffused to a neighboring pixel by multiplying the error data by an error filter value predetermined for the neighboring pixel. The computed error is added to a stored error as the corresponding pixel error of the line buffer 112.

In this fashion, the error diffusion method achieves quality improvement on an image. However, the error diffusion method requires a considerable amount of processing time because of many operations such as the addition of the correction data, the subtraction for the error data, the multiplication of the diffusion error, and the addition of the error.

Next, the blue noise mask method is described.

FIG. 3 is a block diagram illustrating functions for implementing the blue noise mask method.

An input image is supplied to a comparison part 121 by unit of one pixel. The comparison part 121 compares a pixel value of the input image with a threshold matrix created according to the blue noise method in advance. The comparison part 121 generates an output value as follows. If the input pixel value is larger than the threshold, the pixel value is determined as "1". In contrast, if the input pixel value is smaller than the threshold, the pixel value is determined as "0". Here, the value "1" corresponds to a black dot, and the value "0" corresponds to a white dot.

FIG. 4 is a block diagram illustrating functions for implementing another blue noise mask method.

An input image is supplied to a table reference part 131 by unit of one pixel. The table reference part 131 outputs a "1" pattern or a "0" pattern with reference to a pattern table 132 in which patterns corresponding to input pixel values are registered in advance.

In this blue noise mask method, the input value is just compared with the threshold as shown in FIG. 3, or the reference table created corresponding to input values in advance is just referred to as shown in FIG. 4. Therefore, the blue noise mask method can realize high speed processing.

In the error diffusion method, although a high-quality image is obtained, a large amount of processing time is required. On the other hand, the blue noise mask method has some problems, for instance, in that the image quality is insufficient because of iterative use of patterns.

It is an object of the present invention to provide an image processing method, an image processing apparatus and a recording medium in which the above-mentioned problems are eliminated.

A more specific object of the present invention is to provide an image processing method, an image processing apparatus and a recording medium that achieve high-speed processing.

DISCLOSURE OF INVENTION

The present invention can select, for instance, the error diffusion method and the blue noise mask method as a gradation processing method. In the present invention, the gradation process according to the error diffusion method is performed for image data of a color component sensitive to a human being in a plurality of planes, and the gradation process according to the blue noise mask method is performed for image data of a color component less sensitive to a human being.

According to the present invention, it is possible to enhance image quality under the error diffusion method and increase processing speed under the blue noise mask method.

For instance, when the plural planes are formed of individual color components of yellow, cyan and magenta, the gradation process is performed for the planes of the color components of the cyan and the magenta in accordance with the error diffusion method, and the gradation process is performed for the plane of the color component of the yellow in accordance with the blue noise mask method.

Also, for instance, when the plural planes are formed of individual color components of red, green and blue, the gradation process is performed for the planes of the color components of the red and the green in accordance with the error diffusion method, and the gradation process is performed for the plane of the color component of the blue in accordance with the blue noise mask method.

Furthermore, according to the present invention, it is possible to switch such a gradation processing method for the individual planes.

Furthermore, according to the present invention, it is possible to select the gradation processing method depending upon weight placed on image quality and processing speed.

BEST MODE FOR CARRYING OUT THE INVENTION

Figure 1:
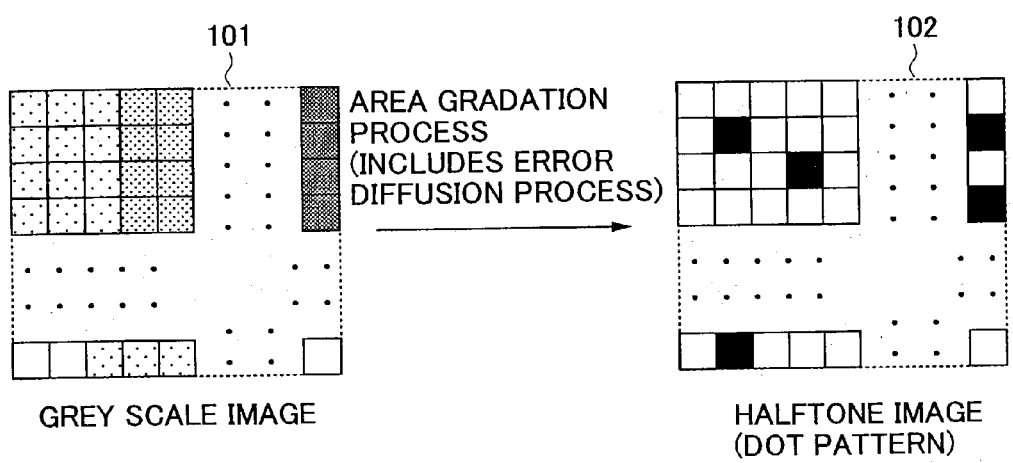
FIG. 1 is a diagram for explaining a gradation process.
Figure 2:
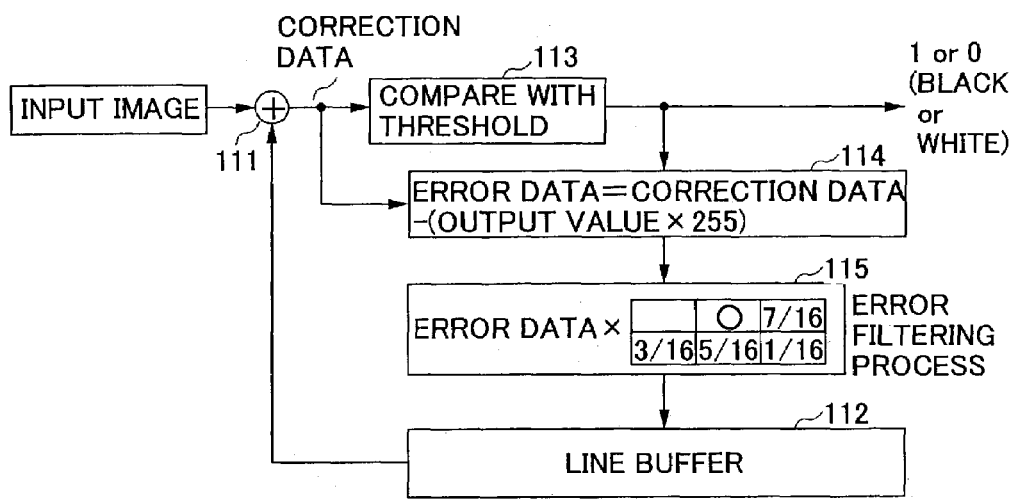
FIG. 2 is a block diagram illustrating functions for implementing an error diffusion method.
Figure 3:
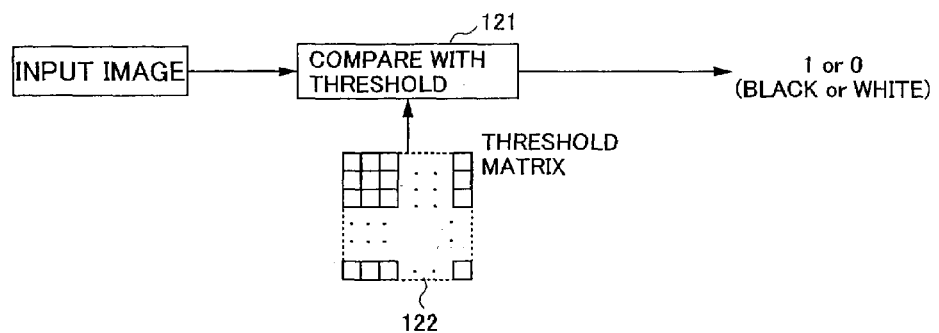
FIG. 3 is a block diagram illustrating functions for implementing a blue noise mask method.
Figure 4:
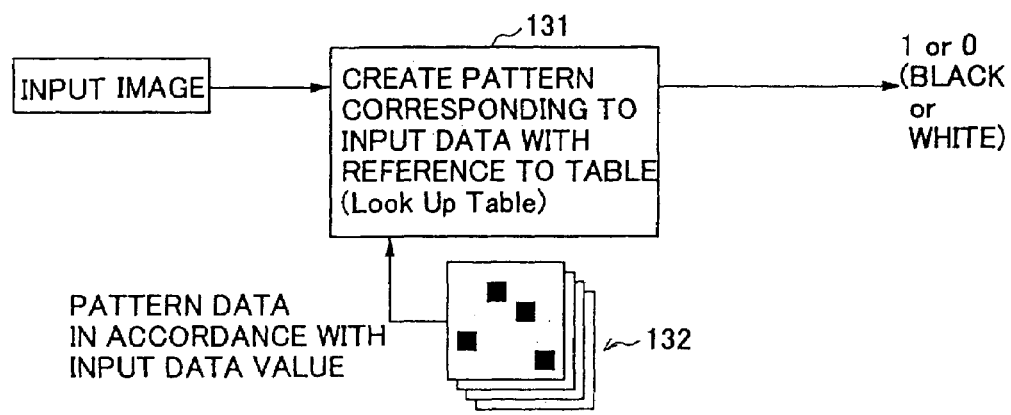
FIG. 4 is a block diagram illustrating functions for implementing another blue noise mask method.
Figure 5:
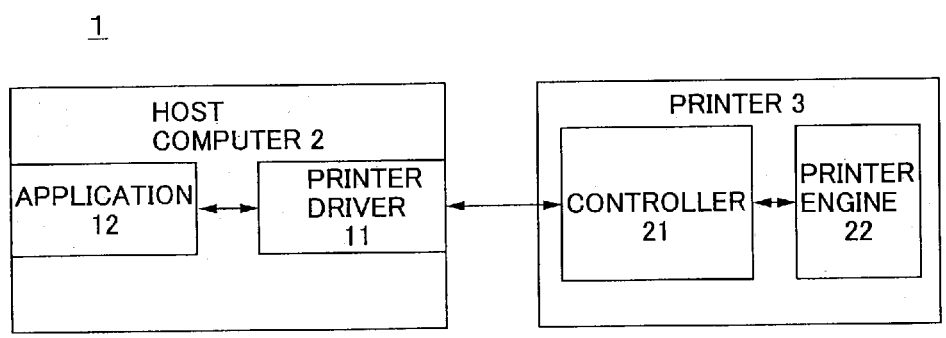
FIG. 5 is a block diagram illustrating a structure according to a first embodiment of the present invention.

FIG. 5 is a block diagram illustrating a structure according to the first embodiment of the present invention.

In this embodiment, an image processing method for processing an image used for a printer is described. A system 1 for implementing the image processing method according to the first embodiment comprises a host computer 2 and a printer 3.

A printer driver 11 for communicating between the host computer 2 and the printer 3 is provided in the host computer 2. The printer driver 11 is software and is installed into a recording medium such as a hard disk drive in the host computer 2. For instance, full-color RGB grey scale image data are supplied from an application 12 to the printer driver 11. The full-color RGB grey scale image data are color-converted into full-color CMY grey scale image data, and then the converted full-color CMY grey scale image data together with a command are delivered to the printer 2.

The printer 2 comprises a controller 21 and a printer engine 22.

The full-color CMY grey scale image data and the command from the printer driver 11 in the host computer 2 are supplied to the controller 21. The controller 21 receives the full-color CMY grey scale image data and the command from the printer driver 11 and performs an area gradation process for the full-color CMY grey scale image data for the purpose of conversion into a CMY print pattern. Then, the converted CMY print pattern is supplied to the printer engine 22.

Also, the controller 21 monitors the printer engine 22, creates a status corresponding to the monitoring result, and supplies the status to the printer driver 11 in the host computer 2. The printer driver 11 provides a print condition based on the status from the controller 21.

When the printer engine 22 receives print patterns of the individual colors C, M and Y from the controller 21, the printer engine 22 prints out the print patterns.

Next, the controller 21 is described in detail.

Figure 6:
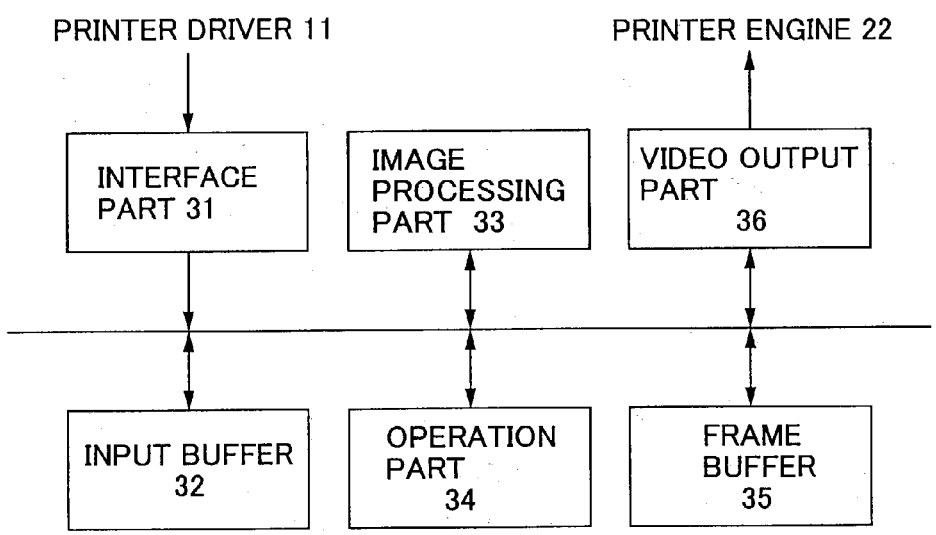
FIG. 6 is a block diagram illustrating a controller according to the first embodiment of the present invention.

FIG. 6 is a block diagram of the controller according to the first embodiment of the present invention.

The controller 21 comprises an interface part 31, an input buffer 32, an image processing part 33, an operation part 34, a frame buffer 35, and a video output part 36.

The interface part 31 receives full-color CMY grey scale image data from the printer driver 11. The full-color CMY grey scale image data supplied from the printer driver 11 to the interface part 31 are stored in the input buffer 32.

The image processing part 33 is a program installed in a memory in the printer 21 in advance. The image processing part 33 reads the full-color CMY grey scale image data from the input buffer 32 and performs an area gradation process for the full-color CMY grey scale image data in accordance with a processing speed designated through the operation part 34 in order to obtain a CMY halftone image pattern. The CMY halftone image pattern obtained in the image processing part 33 is stored in the frame buffer 35. The CMY halftone image pattern stored in the frame buffer 35 is supplied to the video output part 36. The video output part 36 supplies the CMY halftone pattern in the frame buffer 35 to the printer engine 22.

Next, the image processing part 33 is described in detail.

Figure 7:
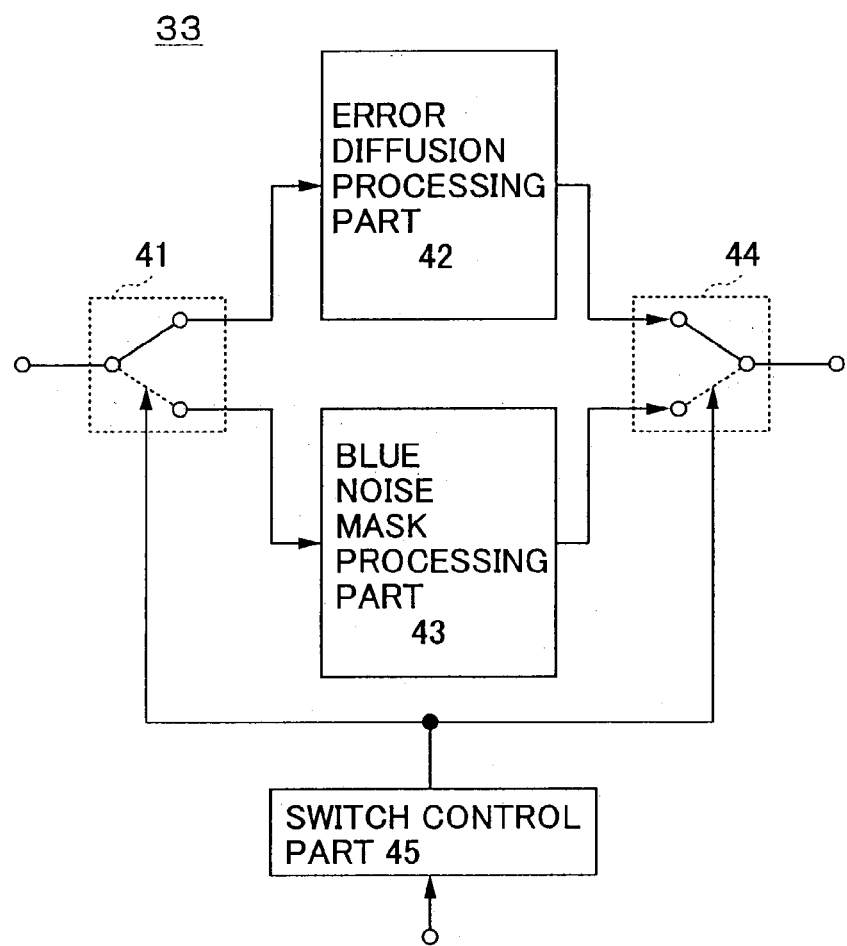
FIG. 7 is a block diagram illustrating functions of an image processing part according to the first embodiment of the present invention.

FIG. 7 is a block diagram illustrating functions of the image processing part according to the first embodiment of the present invention.

The image processing part 33 comprises an input switch 41, an error diffusion processing part 42, a blue noise mask processing part 43, an output switch 44, and a switch control part 45.

The input switch receives CMY grey scale image data from the input buffer 32. Based on a switch control signal from the switch control part 45, the input switch 41 supplies the CMY grey scale image data from the input buffer 32 to the error diffusion processing part 42 or the blue noise mask processing part 43 for each plane of the colors C, M and Y.

The error diffusion processing part 42 performs the area gradation process according to the error diffusion method. The blue noise mask processing part 43 performs the area gradation process according to the blue noise mask method. Process results of the error diffusion processing part 42 and the blue noise mask processing part 43 are supplied to the output switch 44.

Based on a switch control signal from the switch control part 45, the output switch 44 selectively outputs output results of the error diffusion processing part 42 or the blue noise mask processing part 43 for each plane of the colors C, M and Y. The output of the output switch 44 is stored in the frame buffer 35.

The switch control part 45 controls switching operations of the input switch 41 and the output switch 44 in accordance with instructions from the operation part 34 or commands from the printer driver 11. In the operation part 34, for instance, a user can select one of first through fourth area gradation processes.

The first area gradation process is intended to enhance image quality. In the first area gradation process, all planes of C, M and Y are converted into halftone image data according to the error diffusion process. The second area gradation process is intended to increase the processing speed in a state where image quality is maintained. In the second area gradation process, the C and the M planes are converted into halftone image data according to the error diffusion process, and the Y plane is converted into halftone image data according to the blue noise mask process.

The third area gradation process is intended to enhance image quality in a state where processing speed is maintained. The C plane is converted into halftone image data according to the error diffusion process, and the M and the Y planes are converted into halftone image data according to the blue noise mask process. The fourth area gradation process is intended to increase processing speed, and all the C, M and Y planes are converted into halftone image data according to the blue noise mask process.

In a case where the first area gradation process is selected through a command from the operation part 34 or the printer driver 11, the switch control part 45 controls the switching operation such that the input switch 41 and the output switch 44 follow the solid lines in FIG. 7 for all the C, M and Y planes in order to convert all the C, M and Y planes into halftone images according to the error diffusion process. In a case where the second area gradation process is selected through a command from the operation part 34 or the printer driver 11, when grey scale image data of the C and M planes are supplied, the switch control part 45 controls the switching operation such that the input switch 41 and the output switch 44 follow the solid lines in FIG. 7 in order to convert the C and the M planes into halftone images according to the error diffusion process. On the other hand, when grey scale image data of the Y plane are supplied, the switch control part 45 controls the switching operation such that the input switch 41 and the output switch 44 follow the dotted lines in FIG. 7 in order to convert the Y plane into a halftone image according to the blue noise mask process.

In a case where the third area gradation process is selected through a command from the operation part 34 or the printer driver 11, when grey scale image data of the C plane are supplied, the switch control part 45 controls the switching operation such that the input switch 41 and the output switch 44 follow the solid lines in FIG. 7 in order to convert the C plane into a halftone image according to the error diffusion process. On the other hand, when grey scale image data of the M and the Y planes are supplied, the switch control part 45 controls the switching operation such that the input switch 41 and the output switch 44 follow the dotted lines in FIG. 7 in order to convert the M and the Y planes into halftone images according to the blue noise mask process. In a case where the first area gradation process is selected through a command from the operation part 34 or the printer driver 11, the switch control part 45 controls the switching operation such that the input switch 41 and the output switch 44 follow the dotted lines in FIG. 7 for all the C, M and Y planes in order to convert all the C, M and Y planes into halftone images according to the blue noise mask process.

Figure 8:
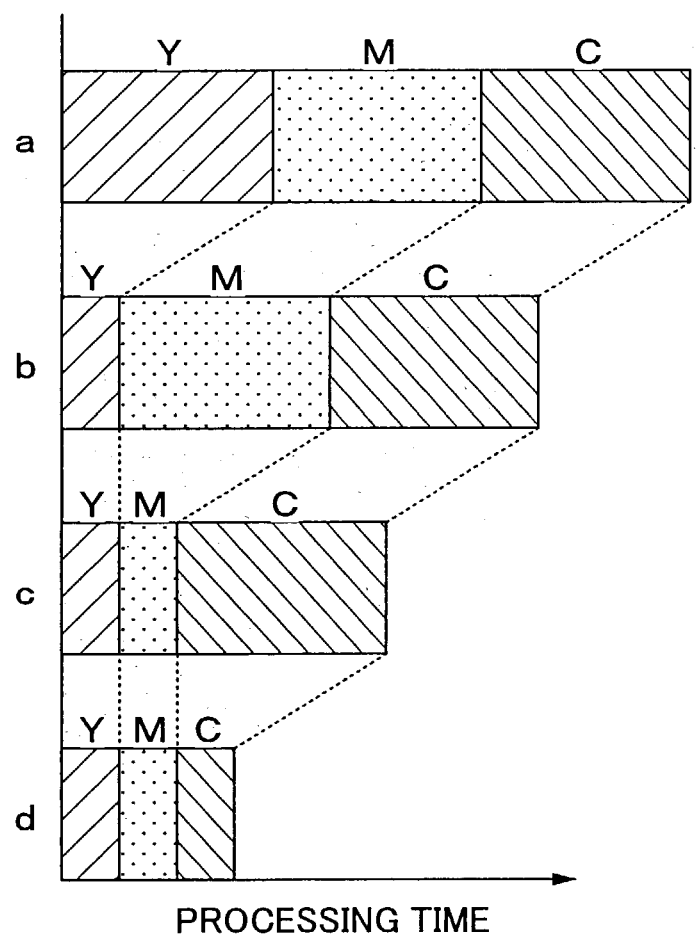
FIG. 8 is a diagram for explaining processing time according to the first embodiment of the present invention.

FIG. 8 is a diagram for explaining processing time according to the first embodiment of the present invention. In FIG. 8, the reference notations "a", "b", "c" and "d" represent the processing time for the first area gradation process, the second area gradation process, the third area gradation process and the fourth area gradation process, respectively.

According to this embodiment, if the C and the M planes are converted into halftone images according to the error diffusion method and the Y plane is converted into the halftone image according to the blue noise mask method as in the second area gradation process, it is possible to obtain the halftone images in the processing time as shown in the "b" in FIG. 8 faster than the case where all the C, M and Y planes are converted into halftone images according to the error diffusion method as shown in the "a" in FIG. 8. At this time, since the Y plane is less conspicuous than the C and the M planes, a user rarely senses degradation of the image quality as a whole even if the Y plane is converted into a halftone image according to the blue noise mask method. Here, when the processing time of the first area gradation process is "1", the second area gradation process has a processing time of "0.68". Therefore, it is possible to considerably shorten the processing time thereof.

Also, if the C plane is converted into the halftone image according to the error diffusion method and the M and the Y planes are converted into the halftone images according to the blue noise mask method as in the third area gradation process, it is possible to obtain the halftone images as shown in the "c" in FIG. 8 faster than the second area gradation process shown in the "b" in FIG. 8. Also, it is possible to obtain the higher-quality halftone images than the case where all the C, M and Y planes are converted into the halftone images according to the blue noise mask method.

Although this embodiment is configured so that a user can select one of the first through the fourth area gradation processes through the operation part 34, the selection may be automatically determined in accordance with a density level detected for each of the C, M and Y planes.

Also, although the first embodiment serially processes the C, M and Y planes, the process may be performed in parallel for each plane.

Figure 9:
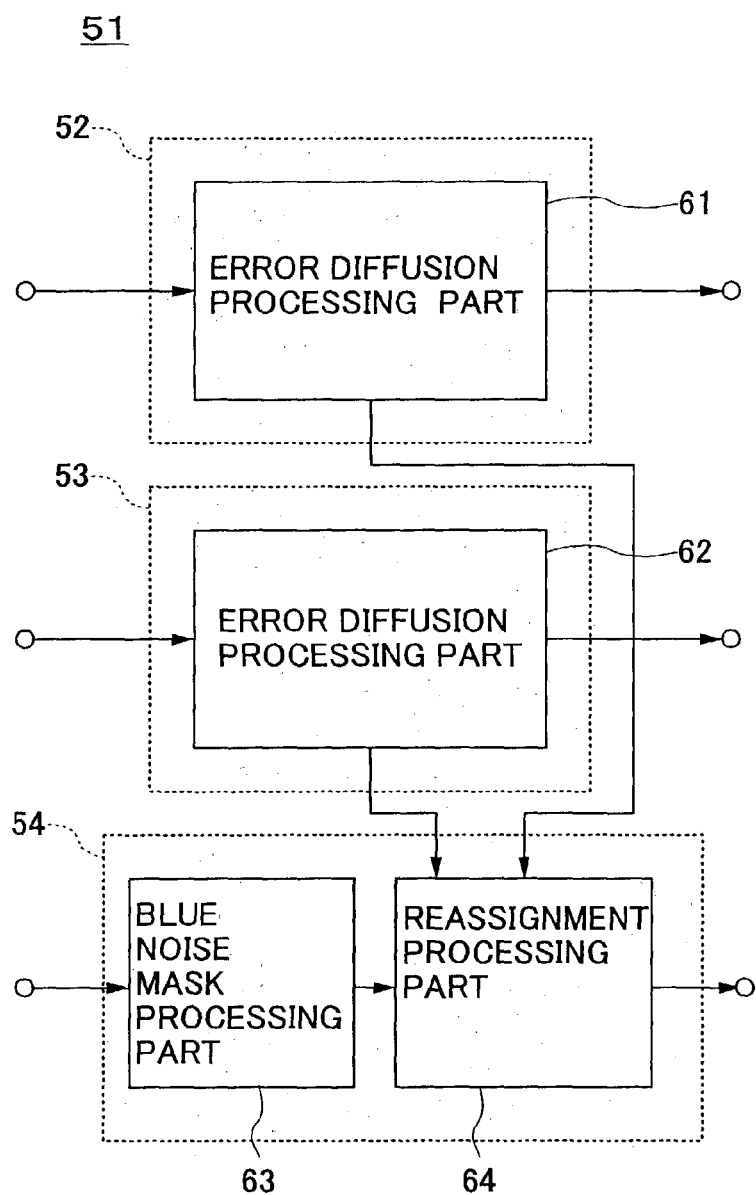
FIG. 9 is a block diagram illustrating functions of an image processing part according to a second embodiment of the preset invention.

FIG. 9 is a block diagram illustrating functions of an image processing part according to the second embodiment of the present invention.

This embodiment is different from the first embodiment in that an image processing part 51 according to this embodiment is different from the image processing part 33 shown in FIG. 7.

The image processing part 51 according to the second embodiment comprises a C plane processing part 52, an M plane processing part 53 and a Y plane processing part 54.

The C plane processing part 52 includes an error diffusion processing part 61. The error diffusion processing part 61 converts grey scale image data of the C plane into a halftone image according to the error diffusion method.

The M plane processing part 53 includes an error diffusion processing part 62. The error diffusion processing part 61 converts grey scale image data of the M plane into a halftone image according to the error diffusion method.

The Y plane processing part 54 includes a blue noise mask processing part 63 and a reassignment processing part 64. The blue noise mask processing part 63 converts grey scale image data of the Y plane into a halftone image according to the blue noise mask method. The halftone image converted according to the blue noise mask method is supplied to the reassignment processing part 64.

The reassignment processing part 64 performs a reassignment process for each dot of the halftone image from the blue noise mask processing part 63 with reference to the corresponding dots of the halftone images of the other planes.

Figure 10:
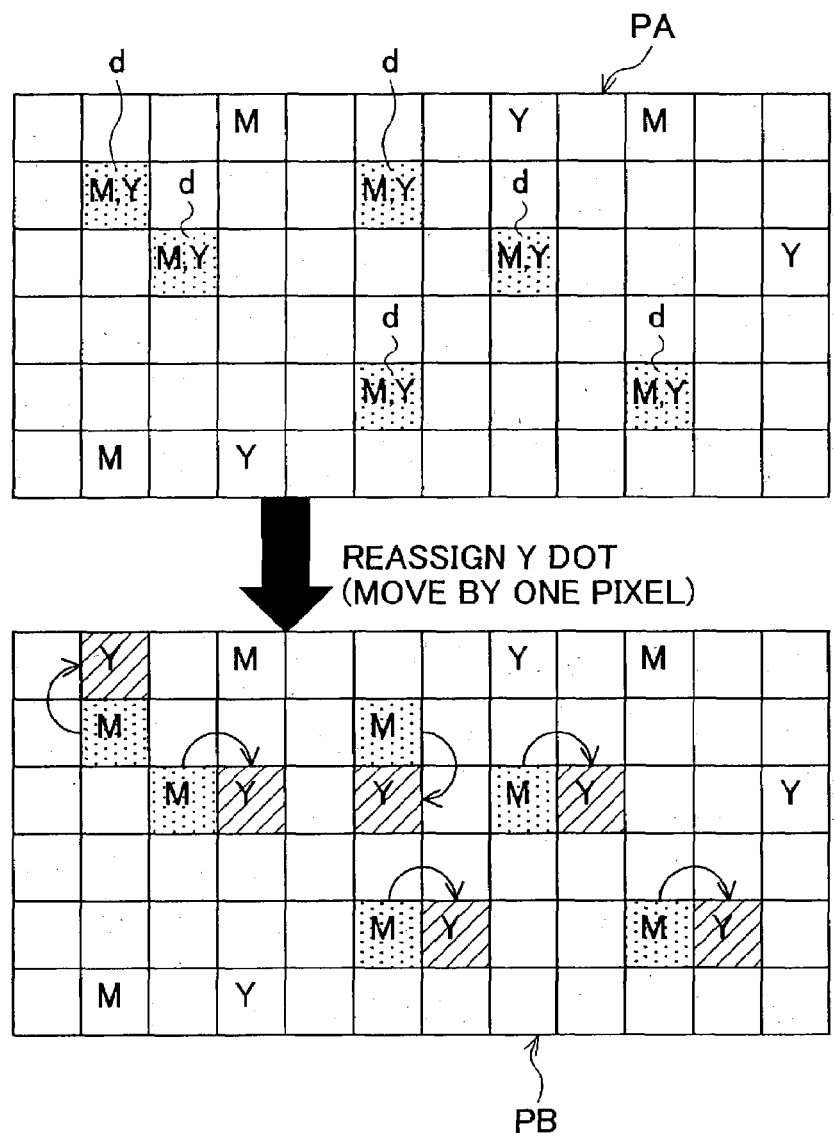
FIG. 10 is a diagram for explaining an operation of a reassignment process according to the second embodiment of the present invention.

FIG. 10 is a diagram for explaining the reassignment process according to the second embodiment of the present invention. In FIG. 10, the reference notation PA shows dot assignments of the M and the Y planes before the reassignment process, and the reference notation PB shows dot assignments of the M and the Y planes after the reassignment process.

As shown in PA in FIG. 10, when plotted pixels of the M plane and plotted pixels of the Y plane are overlapped at the pixels d, the plotted pixels of the Y plane are reassigned to the neighboring pixels as shown by oblique arrows in PB in FIG. 10.

According to the reassignment process by the reassignment processing part 64, it is possible to eliminate the overlaps of the individual C, M and Y color tones and reduce secondary colors. As a result, it is possible to make the color tone of the whole image bright.

Figure 11:
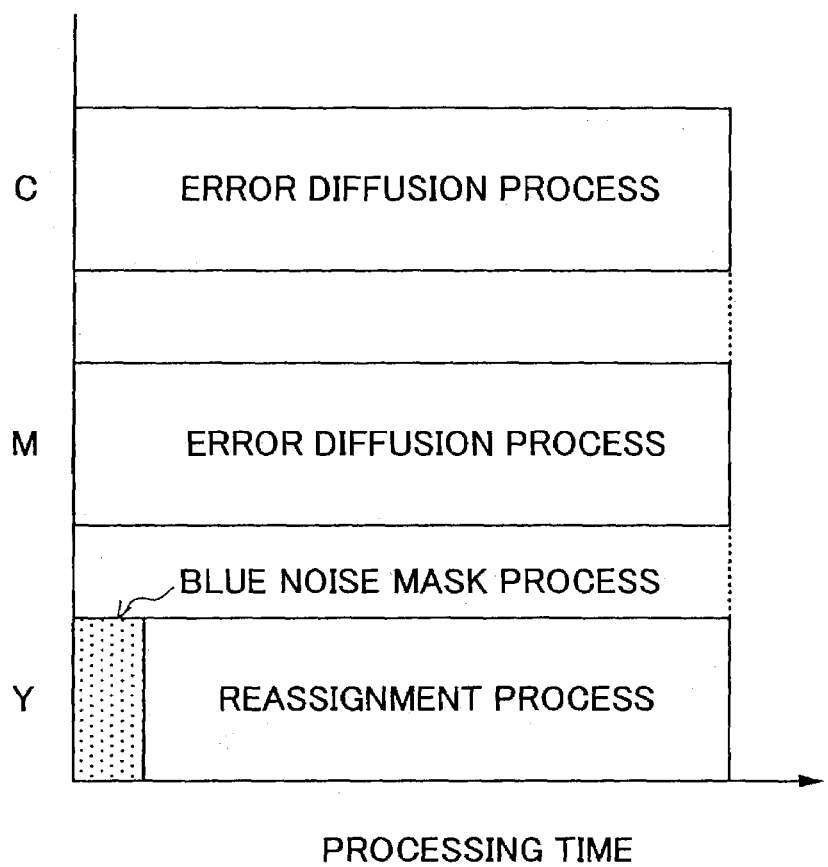
FIG. 11 is a diagram for explaining processing time according to the second embodiment of the present invention.

FIG. 11 is a diagram for explaining processing time according to the second embodiment of the present invention.

In FIG. 11, the reference notations C, M and Y represent processing times for the C, M, and Y planes, respectively.

As shown in FIG. 11, the blue noise mask processing part 63 can perform the blue noise mask process in a sufficiently shorter time than the error diffusion process by the error diffusion processing parts 61 and 62. As a result, it is possible to expand the Y plane faster than the other planes according to the blue noise mask process and perform the reassignment process for the expanded image with reference to the C and M planes. Therefore, the processing time of the Y plane is not longer than the processing times of the C and M planes.

Here, for instance, when the processing times for the error diffusion process are "1"s in the error diffusion processing parts 61 and 62, the processing time for the blue noise mask process is about "0.01" in the blue noise mask processing part 63. The remaining "0.99" can be used for the reassignment process.

In this embodiment, the reassignment process is performed with reference to the M plane. However, the C plane may be referred to. Also, the reassignment process may be performed with reference to both of the C and M planes.

Furthermore, although the first and the second embodiments handle the case where the colors C, M and Y are used for the image processing, the colors R, G and B may be used. In this case, if the colors R, G and B are used corresponding to the colors C, M and Y, respectively, it is possible to obtain operations and effects similar to the case where the color C, M and Y are used.

Here, the representing color combination is not limited to the color combinations CMY and RGB. Other color combinations may be used.

Figure 12:
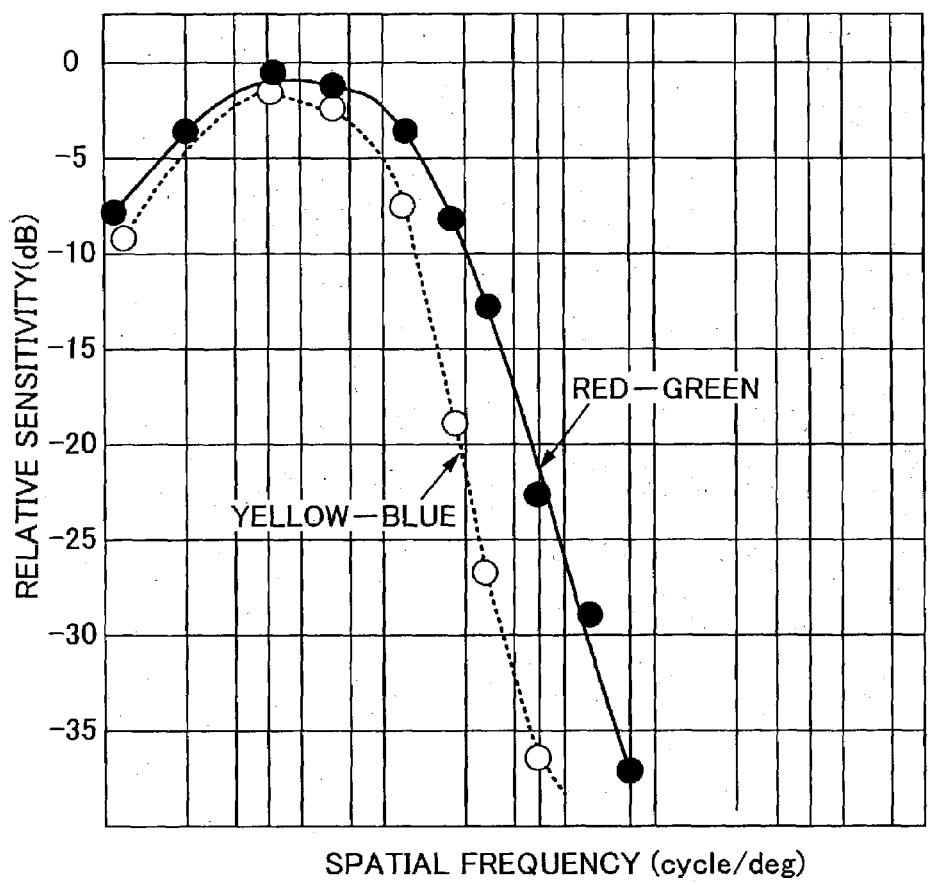
FIG. 12 is a diagram illustrating relative sensitivity of chromaticity to spatial frequency.

In this case, since the yellow-blue color system has less relative sensitivity than the red-green color system as shown in FIG. 12, it is desirable to use the blue noise mask method for the yellow-blue color system. Here, FIG. 12 is cited from S. Sakata and H. Isono, "Spatial Frequency Characteristics of Chromaticity in Visual Sense (Color Difference Distinctive Range)," Journal of The Institute of Image Information and Television Engineers, Vol. 31, No. 1, pp. 29–35, 1977.

Furthermore, the first and the second embodiments handle the case where plane-sequential processing is performed for each color plane independently and sequentially. However, even if point-sequential processing is performed for each of C, M and Y values (R, G and B values) of individual pixels, it is possible to obtain operations and effects similar to the plane sequential processing.

Furthermore, although the first and the second embodiments handle the combination of the error diffusion method and the blue noise mask process, other processing methods such as a dot screen method may be combined.

Figure 13:
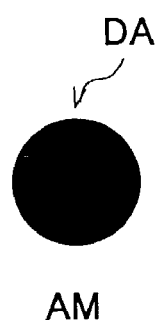
FIG. 13 is a diagram for explaining a screening method.
Figure 13:
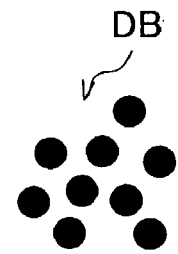

Screening methods can be classified into AM (Amplitude Modulation) methods and FM (Frequency Modulation) methods. In the AM method, an image gradation is represented by varying dot size as shown in DA in FIG. 13. In the FM method, an image gradation is represented by varying dot density as shown in DB in FIG. 13.

When processing methods are combined, it is possible to make the dot size approximately equal by combining processing methods belonging to the AM method or processing methods belonging to the FM method. For this reason, it is possible to realize proper gradation representation in this case.

Furthermore, the area gradation process is performed by the image processing part 33 installed in the printer 2 according to the first and the second embodiments. However, the printer driver 11 installed into the host computer 2 may perform the area gradation process and supply expanded data to the printer 2.

The present invention is not limited to the specifically disclosed embodiments, and variations and modifications may be made without departing from the scope of the present invention.

The invention claimed is:

1. An image processing method for obtaining an image by performing a gradation process for a plurality of kinds of image data, comprising the steps of:
   performing a gradation process on each image data of the plurality of kinds of image data by selectively applying a first gradation processing method and a second gradation processing method wherein the second gradation processing method has a gradation processing speed higher than the first gradation processing method does; and
   rearranging a pixel gradation-processed with the second gradation processing method with reference to a pixel gradation-processed with the first gradation processing method.

2. The image processing method as claimed in claim 1, wherein the first gradation processing method is an error diffusion method and the second gradation processing method is a blue noise mask method.

3. The image processing method as claimed in claim 2, wherein said kinds of image data include image data of at least color components of yellow, cyan and magenta, and the gradation process is performed for image data of the color components of the cyan and the magenta in accordance with the error diffusion method and for image data of the color component of the yellow in accordance with the blue noise mask method.

4. The image processing method as claimed in claim 2, wherein said kinds of image data include image data of at least color components of red, green and blue, and the gradation process is performed for image data of the color components of the red and the green in accordance with the error diffusion method and for image data of the color component of the blue in accordance with the blue noise mask method.

5. The image processing method as claimed in claim 1, wherein said gradation processing methods for said kinds of the image data are allowed to be switched.

6. An image processing apparatus for obtaining an image by performing a gradation process for a plurality of kinds of image data, comprising:
   an image processing part performing a gradation process on each image data of the plurality of kinds of image data by selectively applying a first gradation processing method and a second gradation processing method wherein the second gradation processing method has a gradation processing speed higher than the first gradation processing method does, and rearranging a pixel gradation-processed with the second gradation processing method with reference to a pixel gradation-processed with the first gradation processing method.

7. The image processing apparatus for obtaining an image by performing a gradation process for a plurality of kinds of image data as claimed in claim 6,
wherein in said image processing part, the first gradation processing method is an error diffusion method and the second gradation processing method is a blue noise mask method.

8. The image processing apparatus as claimed in claim 7, wherein said kinds of the image data include image data of at least color components of yellow, cyan and magenta, and a switching part controls to process image data of the color components of the cyan and the magenta in accordance with said error diffusion processing part and image data of the color component of the yellow in accordance with said blue noise mask processing part.

9. The image processing apparatus as claimed in claim 7, wherein said kinds of the image data include image data of at least color components of red, green and blue, and a switching part controls to process image data of the color components of the red and the green in accordance with said error diffusion processing part and image data of the color component of the blue in accordance with said blue noise mask processing part.

10. The image processing apparatus as claimed in claim 6, further comprising a selection part capable of selecting a gradation processing method for the kinds of the image data.

11. A computer readable recording medium for storing a program, the program causing a computer to execute the steps of:
performing a gradation process on each image data of the plurality of kinds of image data by selectively applying a first gradation processing method and a second gradation processing method wherein the second gradation processing method has a gradation processing speed higher than the first gradation processing method does; and
rearranging a pixel gradation-processed with the second gradation processing method with reference to a pixel gradation-processed with the first gradation processing method, wherein the first gradation processing method is an error diffusion method and the second gradation processing method is a blue noise mask method.

* * * * *